(12) United States Patent
Randall et al.

(10) Patent No.: US 10,221,297 B2
(45) Date of Patent: Mar. 5, 2019

(54) RUBBER COMPOSITIONS AND USES THEREOF

(71) Applicants: Bridgestone Corporation, Chuo-ku (JP); Amy M. Randall, Akron, OH (US); Yuan-Yong Yan, Copley, OH (US); Kevin M. McCauley, Akron, OH (US)

(72) Inventors: Amy M. Randall, Akron, OH (US); Yuan-Yong Yan, Copley, OH (US); Kevin M. McCauley, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 0 days.

(21) Appl. No.: 15/518,984

(22) PCT Filed: Oct. 15, 2015

(86) PCT No.: PCT/US2015/055641
§ 371 (c)(1),
(2) Date: Apr. 13, 2017

(87) PCT Pub. No.: WO2016/061300
PCT Pub. Date: Apr. 21, 2016

(65) Prior Publication Data
US 2017/0240722 A1 Aug. 24, 2017

Related U.S. Application Data

(60) Provisional application No. 62/064,153, filed on Oct. 15, 2014.

(51) Int. Cl.
| | |
|---|---|
| *C08K 5/20* | (2006.01) |
| *C08K 5/01* | (2006.01) |
| *C08K 3/04* | (2006.01) |
| *C08K 3/22* | (2006.01) |
| *C08L 9/00* | (2006.01) |
| *C08K 3/00* | (2018.01) |
| *C08K 3/013* | (2018.01) |

(52) U.S. Cl.
CPC ............. *C08K 5/20* (2013.01); *C08K 3/00* (2013.01); *C08K 3/04* (2013.01); *C08K 3/22* (2013.01); *C08K 5/01* (2013.01); *C08L 9/00* (2013.01); *C08K 3/013* (2018.01); *C08K 2003/2296* (2013.01); *C08L 2205/025* (2013.01)

(58) Field of Classification Search
CPC ... C08K 5/20; C08K 3/04; C08K 3/22; C08K 5/01; C08K 2003/2296; C08L 9/00; C08L 2205/025
See application file for complete search history.

(56) References Cited

U.S. PATENT DOCUMENTS

| | | | |
|---|---|---|---|
| 4,394,473 A | 7/1983 | Winter et al. | |
| 4,534,799 A | 8/1985 | Aguirre | |
| 4,645,792 A | 2/1987 | Chatterjee | |
| 5,962,562 A * | 10/1999 | Wideman ................. | C08K 5/20 524/222 |
| 6,590,017 B1 * | 7/2003 | Hergenrother ............ | B60C 1/00 524/210 |
| 2004/0132912 A1 | 7/2004 | McElwee | |
| 2005/0234165 A1 | 10/2005 | Schaal et al. | |
| 2007/0142514 A1 | 6/2007 | Ishikawa | |
| 2009/0093593 A1 | 4/2009 | Kato et al. | |
| 2010/0317782 A1 | 12/2010 | Hattori | |
| 2011/0028598 A1 | 2/2011 | Veyland et al. | |
| 2013/0190435 A1 | 7/2013 | Skoumal et al. | |
| 2013/0253088 A1 | 9/2013 | Agarwal | |
| 2013/0310512 A1 | 11/2013 | Imoto et al. | |

FOREIGN PATENT DOCUMENTS

| | | |
|---|---|---|
| CN | 101255262 A | 9/2008 |
| CN | 103937235 A | 7/2014 |
| CN | 104059287 A | 9/2014 |
| EP | 123823 A1 | 9/1986 |
| EP | 0570160 A2 | 11/1993 |
| EP | 1860136 A1 | 11/2007 |
| JP | H07-278355 A | 10/1995 |
| JP | 2006-176579 A | 7/2006 |
| WO | 2001088027 A1 | 11/2001 |
| WO | 03/091324 A1 | 11/2003 |
| WO | 2010016946 A2 | 2/2010 |

OTHER PUBLICATIONS

Terech, Pierre, et al., "Structure of a Transient Network Made up of Entangled Monomolecular Organometallic Wires in Organic Liquids. Effects of an Endcapping Molecule," Langmuir, 1999, vol. 15, pp. 5513-5525.

Terech, Pierre, et al., "Low Molecular Mass Gelators of Organic Liquids and the Properties of their Gels," Chem. Rev., v. 97, pp. 3133-3159 (1997).

Shepard, Thomas A., et al., Self-Organization and Polyolefin Nucleating Efficacy of 1,3:2,4-Di-p-methylbenzylidene Sorbitol, J. of Polymer Science: Part B: Polymer Physics, vol. 35, pp. 2617-2628 (1997).

Roosma, Jorg, et al., "Supramolecular Materials From Benzene-1,3,5-tricarboxamide-Based Nanorods," J. Am. Chem. Soc., vol. 130, pp. 1120-1121 (2008).

(Continued)

*Primary Examiner* — Robert D. Harlan
(74) *Attorney, Agent, or Firm* — Meredith E. Hooker; Jenny L. Sheaffer

(57) ABSTRACT

The present disclosure is directed to rubber compositions containing a chemical additive capable of generating or enhancing strain-induced crystallization into the compositions, and tires containing the rubber compositions in one or more components such as sidewalls or treads. The chemical additive is at least one fatty acid amide compound of formula (I). As well, certain embodiments relate to methods for achieving reduced wear or improved durability in a tire tread or tire sidewall by using the chemical additives.

19 Claims, No Drawings

(56) References Cited

OTHER PUBLICATIONS

Mes, Tristan, et al., "Hydrogen-Bond Engineering in Supramolecular Polymers: Polarity Influence on the Self-Assembly of Benzene-1,3,5-Tricarboxamides," Macromolecules, vol. 43, pp. 1981-1991 (2010).

Feng, L., et al., "Thermodynamics of Tripodal Trisamide-Solvent Organogels," Abstracts of Papers, 241st ACS National Meeting & Exposition, Anaheim, CA, United States, Mar. 27-31, 2011, POLY-261 (Abstract only).

Aquino, Manuel A.S., "Diruthenium and diosmium tetracarboxylates: synthesis, physical properties and applications," Coordination Chemistry Reviews, v. 170, issue 1, pp. 141-202 (Mar. 1998), Abstract only.

"Activators" excerpt from Rubber Handbook by Struktol, Sep. 2004, pp. 54-60.

International Preliminary Report on Patentability and Opinion from PCT application PCT/US2015/055647 (dated Apr. 18, 2017).

International Search Report from PCT application PCT/US2015/055647 (dated Jan. 28, 2016).

International Preliminary Report on Patentability and Opinion from PCT application PCT/US2015/055641 (dated Apr. 18, 2017).

International Search Report from PCT application PCT/US2015/055641 (dated Feb. 5, 2016).

Communication from European Patent Office including Supplementary European Search Report in application EP15849971, dated May 7, 2018 (5 pages).

Communication from European Patent Office including Supplementary European Search Report in application EP15850937, dated May 8, 2018 (6 pages).

\* cited by examiner

RUBBER COMPOSITIONS AND USES THEREOF

FIELD

The present application is directed to rubber compositions containing chemical additives capable of generating or enhancing strain-induced crystallization into the compositions.

BACKGROUND

Natural rubber is known to exhibit a high level of strain-induced crystallization. Strain-induced crystallization is a phase transformation that an amorphous material undergoes when subjected to stress (strain). Generally, crystalline polymer chain are ordered (parallel) and closely packed, and amorphous polymer chains are disordered. The mechanism of strain-induced crystallization is believed to be a primary contributor to natural rubber's unique properties, including its outstanding tensile strength and good crack growth resistance. Synthetic rubbers such as polyisoprene, polybutadiene and styrene-butadiene copolymer do not inherently exhibit the high level of strain-induced crystallization that natural rubber possesses.

SUMMARY

The embodiments described herein relate to rubber compositions containing chemical additives capable of generating or enhancing strain-induced crystallization into the compositions, and tires containing the rubber compositions in one or more components such as sidewalls or treads. As well, certain embodiments relate to methods for achieving reduced wear or improved durability in a tire tread or tire sidewall by using the chemical additives.

In a first embodiment, the present disclosure is directed to a rubber composition comprising: (a) 80-100 phr of a synthetic conjugated diene monomer-containing polymer selected from the group consisting of polybutadiene with a cis 1,4-bond content of 85% or greater, polyisoprene, and combinations thereof, (b) 0-20 phr of a conjugated diene monomer containing polymer or copolymer selected from the group consisting of polybutadiene with a cis 1,4-bond content of less than 85%, styrene-butadiene copolymer, neoprene, isobutylene, natural rubber, and combinations thereof, (c) 1-10 phr of at least one fatty acid amide compound of formula (I), (d) 1 to 20 phr of at least one processing oil, and (e) 0-100 phr of at least one reinforcing filler. Formula (I) is as follows: $R^1[C(=O)N(H)R^2]_x$, where x=1, 2 or 3, and each $[C(=O)N(H)R^2]$ is the same or different, $R^1$ is selected from alkyl of C1 to C21, alkenyl of C2 to C21 and cycloalkyl of C3 to C21, aromatic of C5 to C20, alkaryl of C7 to C30, $R^2$ is selected from H, alkyl of C1 to C21, alkenyl of C2 to C21 and cycloalkyl of C3 to C21, aromatic of C5-C20, alkaryl of C7 to C30, $R^3N(H)C(=O)R^4$ with $R^3$ bonded to the N of formula (I), and $R^3N(R^5)_2$ with each $R^5$ independently selected from the group consisting of H, alkyl of C1 to C20, alkenyl of C2 to C20, cycloalkyl of C3 to C20, aromatic of C5 to C20 and alkaryl of C7 to C20 and $R^2$ or the terminal $R^5$ therein optionally substituted with one or more OH, $R^3$ is selected from alkyl of C1 to C20, alkenyl of C2 to C20, and cycloalkylene of C3 to C20, $R^4$ is selected from $R^1$, alkyl of C1 to C20, alkenyl of C2 to C20, cycloalkyl of C3 to C20, aromatic of C5 to C20 and alkaryl of C7 to C20. Furthermore, upon curing, the rubber composition meets at least one of the following conditions (i) or (ii), as follows: (i) exhibits reduced wear as exhibited by having a wear index (measured under at least one slip percentage in the range of 10-75%) that is 110% or higher, based upon a comparative rubber compound that contains no fatty acid amide compound of formula (I) but contains additional processing oil in a phr amount equal to the amount of the at least one fatty acid amide in the synthetic conjugated diene monomer containing polymer composition, and (ii) exhibits strain-induced crystallization.

In a second (and related) embodiment, the present disclosure is directed to a method of achieving reduced wear or improved durability in a tire tread or tire sidewall. The method comprises incorporating a rubber composition comprising components (a)-(e) as follows into a tire tread or tire sidewall. The components are: (a) 80-100 phr of a synthetic conjugated diene monomer-containing polymer selected from the group consisting of polybutadiene with a cis 1,4-bond content of 85% or greater, polyisoprene, and combinations thereof, (b) 0-20 phr of a conjugated diene monomer containing polymer or copolymer selected from the group consisting of polybutadiene with a cis 1,4-bond content of less than 85%, styrene-butadiene copolymer, neoprene, isobutylene, natural rubber, and combinations thereof, (c) 1-10 phr of at least one fatty acid amide compound of formula (I), (d) 1 to 20 phr of at least one processing oil, and (e) 0-100 phr of at least one reinforcing filler. Formula (I) is as follows: wherein formula (I) is $R^1[C(=O)N(H)R^2]_x$, where x=1, 2 or 3, and each $[C(=O)N(H)R^2]$ is the same or different, $R^1$ is selected from alkyl of C1 to C21, alkenyl of C2 to C21 and cycloalkyl of C3 to C21, aromatic of C5 to C20, alkaryl of C7 to C30, $R^2$ is selected from H, alkyl of C1 to C21, alkenyl of C2 to C21 and cycloalkyl of C3 to C21, aromatic of C5-C20, alkaryl of C7 to C30, $R^3N(H)C(=O)R^4$ with $R^3$ bonded to the N of formula (I), and $R^3N(R^5)_2$ with each $R^5$ independently selected from the group consisting of H, alkyl of C1 to C20, alkenyl of C2 to C20, cycloalkyl of C3 to C20, aromatic of C5 to C20 and alkaryl of C7 to C20 and $R^2$ or the terminal $R^5$ therein optionally substituted with one or more OH, $R^3$ is selected from alkyl of C1 to C20, alkenyl of C2 to C20, and cycloalkylene of C3 to C20, $R^4$ is selected from $R^1$, alkyl of C1 to C20, alkenyl of C2 to C20, cycloalkyl of C3 to C20, aromatic of C5 to C20 and alkaryl of C7 to C20. Furthermore, upon curing, the rubber composition meets at least one of the following conditions (i) or (ii), as follows: (i) exhibits reduced wear as exhibited by having a wear index (measured under at least one slip percentage in the range of 10-75%) that is 110% or higher, based upon a comparative rubber compound that contains no fatty acid amide compound of formula (I) but contains additional processing oil in a phr amount equal to the amount of the at least one fatty acid amide in the synthetic conjugated diene monomer containing polymer composition, and (ii) exhibits strain-induced crystallization.

In a third (and related) embodiment, the present disclosure is directed to a method of achieving strain-induced crystallization in a synthetic rubber-based rubber composition. The method comprises using a rubber composition comprising components (a)-(e) as follows, along with a cure package, wherein upon curing the rubber composition exhibits strain-induced crystallization. The components are: (a) 80-100 phr of a synthetic conjugated diene monomer-containing polymer selected from the group consisting of polybutadiene with a cis 1,4-bond content of 85% or greater, polyisoprene, and combinations thereof, (b) 0-20 phr of a conjugated diene monomer containing polymer or copolymer selected from the group consisting of polybutadiene with a cis 1,4-bond content of less than 85%, styrene-butadiene copolymer, neoprene, isobutylene, natural rubber, and combinations thereof, (c) 1-10 phr of at least one fatty acid amide compound of formula (I), (d) 1 to 20 phr of at least one processing oil, and (e) 0-100 phr of at least one reinforcing filler. Formula (I) is as follows: wherein formula (I) is $R^1[C(\!=\!O)N(H)R^2]_x$, where x=1, 2 or 3, and each $[C(\!=\!O)N(H)R^2]$ is the same or different, $R^1$ is selected from alkyl of C1 to C21, alkenyl of C2 to C21 and cycloalkyl of C3 to C21, aromatic of C5 to C20, alkaryl of C7 to C30, $R^2$ is selected from H, alkyl of C1 to C21, alkenyl of C2 to C21 and cycloalkyl of C3 to C21, aromatic of C5-C20, alkaryl of C7 to C30, $R^3N(H)C(\!=\!O)R^4$ with $R^3$ bonded to the N of formula (I), and $R^3N(R^5)_2$ with each $R^5$ independently selected from the group consisting of H, alkyl of C1 to C20, alkenyl of C2 to C20, cycloalkyl of C3 to C20, aromatic of C5 to C20 and alkaryl of C7 to C20 and $R^2$ or the terminal $R^5$ therein optionally substituted with one or more OH, $R^3$ is selected from alkyl of C1 to C20, alkenyl of C2 to C20, and cycloalkylene of C3 to C20, $R^4$ is selected from $R^1$, alkyl of C1 to C20, alkenyl of C2 to C20, cycloalkyl of C3 to C20, aromatic of C5 to C20 and alkaryl of C7 to C20. Furthermore, upon curing, the rubber composition meets at least one of the following conditions (i) or (ii), as follows: (i) exhibits reduced wear as exhibited by having a wear index (measured under at least one slip percentage in the range of 10-75%) that is 110% or higher, based upon a comparative rubber compound that contains no fatty acid amide compound of formula (I) but contains additional processing oil in a phr amount equal to the amount of the at least one fatty acid amide in the synthetic conjugated diene monomer containing polymer composition, and (ii) exhibits strain-induced crystallization.

DETAILED DESCRIPTION

The present disclosure relates to the use of chemical additives in rubber compositions which additives have the ability to generate or enhance strain-induced crystallization, thereby leading to reduced wear or improved durability when the rubber compositions are utilized in tires.

As discussed above, in a first embodiment, the present disclosure is directed to a rubber composition comprising: (a) 80-100 phr of a synthetic conjugated diene monomer-containing polymer selected from the group consisting of polybutadiene with a cis 1,4-bond content of 85% or greater, polyisoprene, and combinations thereof, (b) 0-20 phr of a conjugated diene monomer containing polymer or copolymer selected from the group consisting of polybutadiene with a cis 1,4-bond content of less than 85%, styrene-butadiene copolymer, neoprene, isobutylene, natural rubber, and combinations thereof, (c) 1-10 phr of at least one fatty acid amide compound of formula (I), (d) 1 to 20 phr of at least one processing oil, and (e) 0-100 phr of at least one reinforcing filler. Formula (I) is as follows: $R^1[C(\!=\!O)NHR^2]m$, where m=1, 2 or 3, each $[C(\!=\!O)NHR^2]$ is the same or different, $R^1$ is selected from alkyl of C1 to C21, alkenyl of C2 to C21 and cycloalkyl of C3 to C21, aromatic of C5 to C21, alkaryl of C7 to C30, and $R^2$ is selected from H, alkyl of C1 to C21, alkenyl of C2 to C21 and cycloalkyl of C3 to C21, aromatic of C5-C21, alkaryl of C7 to C30. Furthermore, upon curing, the rubber composition meets at least one of the following conditions (i) or (ii), as follows: (i) exhibits reduced wear as exhibited by having a wear index (measured under at least one slip percentage in the range of 10-75%) that is 110% or higher, based upon a comparative rubber compound that contains no fatty acid amide compound of formula (I) but contains additional processing oil in a phr amount equal to the amount of the at least one fatty acid amide in the synthetic conjugated diene monomer containing polymer composition, and (ii) exhibits strain-induced crystallization.

As discussed above, in a second embodiment, the present disclosure is directed to a method of achieving reduced wear or improved durability in a tire tread or tire sidewall. The method comprises incorporating a rubber composition comprising components (a)-(e) as follows into a tire tread or tire sidewall. The components are: (a) 80-100 phr of a synthetic conjugated diene monomer-containing polymer selected from the group consisting of polybutadiene with a cis 1,4-bond content of 85% or greater, polyisoprene, and combinations thereof, (b) 0-20 phr of a conjugated diene monomer containing polymer or copolymer selected from the group consisting of polybutadiene with a cis 1,4-bond content of less than 85%, styrene-butadiene copolymer, neoprene, isobutylene, natural rubber, and combinations thereof, (c) 1-10 phr of at least one fatty acid amide compound of formula (I), (d) 1 to 20 phr of at least one processing oil, and (e) 0-100 phr of at least one reinforcing filler. Formula (I) is as follows: $R^1(R^3)_n[C(\!=\!O)NHR^2]m$, where n=0 or 1, m=1, 2 or 3, each $[C(\!=\!O)NHR^2]$ is the same or different, $R^1$ is selected from alkyl of C1 to C21, alkenyl of C2 to C21 and cycloalkyl of C3 to C21, aromatic of C5 to C21, alkaryl of C7 to C30, $R^2$ is selected from H, alkyl of C1 to C21, alkenyl of C2 to C21 and cycloalkyl of C3 to C21, aromatic of C5-C21, alkaryl of C7 to C30, and $R^3$ is alkylene selected from C1-C_. Furthermore, upon curing, the rubber composition meets at least one of the following conditions (i) or (ii), as follows: (i) exhibits reduced wear as exhibited by having a wear index (measured under at least one slip percentage in the range of 10-75%) that is 110% or higher, based upon a comparative rubber compound that contains no fatty acid amide compound of formula (I) but contains additional processing oil in a phr amount equal to the amount of the at least one fatty acid amide in the synthetic conjugated diene monomer containing polymer composition, and (ii) exhibits strain-induced crystallization.

As discussed above, in a third (and related) embodiment, the present disclosure is directed to a method of achieving strain-induced crystallization in a synthetic rubber-based rubber composition. The method comprises using a rubber composition comprising components (a)-(e) as follows, along with a cure package, wherein upon curing the rubber composition exhibits strain-induced crystallization. The components are: (a) 80-100 phr of a synthetic conjugated diene monomer-containing polymer selected from the group consisting of polybutadiene with a cis 1,4-bond content of 85% or greater, polyisoprene, and combinations thereof, (b) 0-20 phr of a conjugated diene monomer containing polymer or copolymer selected from the group consisting of polybutadiene with a cis 1,4-bond content of less than 85%, styrene-butadiene copolymer, neoprene, isobutylene, natural rubber, and combinations thereof, (c) 1-10 phr of at least one fatty acid amide compound of formula (I), (d) 1 to 20 phr of at least one processing oil, and (e) 0-100 phr of at least one reinforcing filler. Formula (I) is as follows: wherein formula (I) is $R^1[C(\!=\!O)N(H)R^2]_x$, where x=1, 2 or 3, and each $[C(\!=\!O)N(H)R^2]$ is the same or different, $R^1$ is selected from alkyl of C1 to C21, alkenyl of C2 to C21 and cycloalkyl of C3 to C21, aromatic of C5 to C20, alkaryl of C7 to C30, $R^2$ is selected from H, alkyl of C1 to C21, alkenyl of C2 to C21 and cycloalkyl of C3 to C21, aromatic of C5-C20, alkaryl of C7 to C30, $R^3N(H)C(\!=\!O)R^4$ with $R^3$ bonded to the N of formula (I), and $R^3N(R^5)_2$ with each $R^5$ independently selected from the group consisting of H, alkyl of C1 to C20, alkenyl of C2 to C20, cycloalkyl of C3 to C20, aromatic of C5 to C20 and alkaryl of C7 to C20 and $R^2$ or the terminal $R^5$ therein optionally substituted with one or more OH, $R^3$ is selected from alkyl of C1 to C20, alkenyl of C2 to C20, and cycloalkylene of C3 to C20, $R^4$ is selected from $R^1$, alkyl of C1 to C20, alkenyl of C2 to C20, cycloalkyl of C3 to C20, aromatic of C5 to C20 and alkaryl of C7 to C20. Furthermore, upon curing, the rubber composition meets at least one of the following conditions (i) or (ii), as follows: (i) exhibits reduced wear as exhibited by having a wear index (measured under at least one slip percentage in the range of 10-75%) that is 110% or higher, based upon a comparative rubber compound that contains no fatty acid amide compound of formula (I) but contains additional processing oil in a phr amount equal to the amount of the at least one fatty acid amide in the synthetic conjugated diene monomer containing polymer composition, and (ii) exhibits strain-induced crystallization.

Definitions

The terminology as set forth herein is for description of the embodiments only and should not be construed as limiting the invention as a whole.

As used herein, the term "alkyl" refers to saturated, monovalent or divalent hydrocarbon moieties having linear or branched structure, optionally having one or more methylene therein replaced by oxygen, nitrogen, or sulfur.

As used herein, the term "alkenyl" refers to monovalent or divalent hydrocarbon moieties having linear or branched structure and at least one double-bond between carbons, optionally having one or more methylene therein replaced by oxygen, nitrogen, or sulfur.

As used herein, the term "aromatic" includes monocyclic aromatic compounds based on carbon (i.e., benzene), monocyclic heteroatom-containing aromatic compounds (e.g., furan, pyrrole, thiopene, pyridine), and polycyclic aromatic compounds—both those based on carbon (e.g., naphthalene, anthracene) and those containing heteroatoms (e.g., quinoline).

As used herein, the abbreviation "mL" means milliliters.

As used herein the term "natural rubber" means naturally occurring rubber such as can be harvested from sources such as Hevea rubber trees, guayule shrubs, and dandelions (e.g., TKS). In other words, the term "natural rubber" should not be construed as including synthetic polyisoprene.

As used herein, the term "phr" means parts per one hundred parts rubber. The 100 parts rubber includes the total of the (a) at least one polymer and the (b) at least one polymer or copolymer.

As used herein the term "polyisoprene" means synthetic polyisoprene. In other words, the term is used to indicate the polymer that is manufactured from isoprene monomers, and should not be construed as including naturally occurring rubber (e.g., Hevea natural rubber, guayule-sourced natural rubber or dandelion-sourced natural rubber).

Polymers

As discussed above, according to the first-third embodiments, the rubber composition comprises 80-100 phr of a synthetic conjugated diene monomer-containing polymer selected from the group consisting of polybutadiene with a cis 1,4-bond content of 85% or greater, polyisoprene, and combinations thereof. In certain embodiments of the first-third embodiments, the rubber composition comprises 90-100 phr of a synthetic conjugated diene monomer-containing polymer selected from the group consisting of polybutadiene with a cis 1,4-bond content of 85% or greater, polyisoprene, and combinations thereof. In yet other embodiments of the first-third embodiments, the rubber composition comprises 100 phr of a synthetic conjugated diene monomer-containing polymer selected from the group consisting of polybutadiene with a cis 1,4-bond content of 85% or greater, polyisoprene, and combinations thereof. It should be understood that the rubber compositions according to the first-third embodiments can include 80-100 phr (in total) of one or more than one of polybutadiene with a cis 1,4-bond content of 85% or greater and polyisoprene. Moreover, such rubber compositions can include more than one type of polybutadiene having a cis 1,4-bond content of 85% or greater, more than one type of polyisoprene, and combinations thereof.

As discussed above, according to the first-third embodiments, when the synthetic conjugated diene monomer-containing polymer includes polybutadiene, the polybutadiene has a cis 1,4-bond content of 85% of greater. In certain embodiments of the first-third embodiments, the polybutadiene has a cis 1,4-bond content of 90% or greater, 92% or greater, or 95% or greater. In certain embodiments of the first-third embodiments, the polybutadiene has a cis 1,4-bond content of 85-99%, 85-98%, 85-97%, 90-99%, 90-98%, 90-97%, 92-99%, 92-98%, 92-97%, 95-99%, 95-98%, or 95-97%.

Generally, various polymerization methods are known for producing polybutadiene having a cis 1,4-bond content of 85% or greater, 90% or greater, 92% or greater, or 95% or greater and it should be understood that the particular method by which the polybutadiene is produced is not limited as long as the resulting polybutadiene has the specified cis 1,4-bond content. The percentages are based upon the number of diene mer units adopting the cis-1,4 linkage versus the total number of diene mer units. Polymerization of high-cis 1,4-polybutadiene is described in U.S. Pat. Nos. 3,297,667, 3,541,063, 3,794,604, 4,461,883, 4,444,903, 4,525,594, 4,699,960, 5,017,539, 5,428,119, 5,064,910, and 5,844,050, 7,094,849, all of which are hereby incorporated by reference. Exemplary polymerization methods include, but are not limited to, those employing Ziegler-Natta catalysts based on transition metals (e.g., lanthanides such as neodymium), nickel catalysts and titanium-based catalysts as well as solution, emulsion and bulk polymerization processes. Generally, the cis-1,4-, 1,2-, and trans-1,4-linkage contents in a given polymer such as polybutadiene can be determined by standard and well-established analytical methods such as infrared spectroscopy.

As discussed above, according to the first-third embodiments, the rubber composition can include polyisoprene. In certain embodiments according to the first-third embodiments, the polyisoprene is a high cis polyisoprene. In certain embodiments according to the first-third embodiments, the high cis polyisoprene has a cis 1,4-bond content of 90% of greater. In certain embodiments of the first-third embodiments, the polyisoprene has a cis 1,4-bond content of 90% or greater, 92% or greater, or 95% or greater. In certain embodiments of the first-third embodiments, the polyisoprene has a cis 1,4-bond content of 90-99%, 90-98%, 90-97%, 92-99%, 92-98%, 92-97%, 95-99%, 95-98%, or 95-97%.

Generally, various polymerization methods are known for producing polyisoprenes, including polyisoprenes having a cis 1,4-bond content of 90% or greater, and it should be understood that the particular method by which the polyisoprene is produced is not limited as long as the resulting polymer has the desired cis 1,4-bond content. As previously discussed with respect to polybutadiene, the percentages are based upon the number of diene mer units adopting the cis-1,4 linkage versus the total number of diene mer units. Polymerization of high-cis polyisoprene is described in U.S. Pat. Nos. 8,664,343; 8,188,20; 7,008,899; 6,897,270; 6,699,813, all of which are hereby incorporated by reference. Exemplary polymerization methods include, but are not limited to, those employing Ziegler-Natta catalyst systems and those employing anionic polymerization with organometallic catalysts such as alkyl lithium in hydrocarbon solvents. As previously discussed with respect to polybutadiene, the cis-1,4-, 1,2-, and trans-1,4-linkage contents in a given polymer such as polyisoprene can be determined by standard and well-established analytical methods such as infrared spectroscopy.

As discussed above, in certain embodiments of first-third embodiments, the rubber composition comprises 0-20 phr of a conjugated diene monomer containing polymer or copolymer selected from the group consisting of polybutadiene with a cis 1,4-bond content of less than 85%, styrene-butadiene copolymer, neoprene, isobutylene, natural rubber, and combinations thereof. Various methods are known for producing each of the enumerated conjugated diene monomer containing polymers or copolymers. As well, numerous commercial sources of each are well-known. As non-limiting examples Firestone Polymers offers various grades of its Diene™ polybutadiene which has a cis 1,4-bond content of 40% as well as various grades of its Duradene™ solution polymerized styrene-butadiene copolymer. Other commercial sources of the enumerated conjugated diene monomer containing polymers or copolymers are well known, including sources for emulsion polymerized styrene-butadiene copolymer, functionalized versions of styrene-butadiene copolymer, neoprene, isobutyl and natural rubber.

Fatty Acid Amide

As discussed above, according to the first-third embodiments, the rubber composition comprises 1-10 phr of at least one fatty acid amide compound of formula (I). Formula (I) is as follows: $R^1[C(=O)N(H)R^2]_x$, where x=1, 2 or 3, and each $[C(=O)N(H)R^2]$ is the same or different, $R^1$ is selected from alkyl of C1 to C21, alkenyl of C2 to C21 and cycloalkyl of C3 to C21, aromatic of C5 to C20, alkaryl of C7 to C30, $R^2$ is selected from H, alkyl of C1 to C21, alkenyl of C2 to C21 and cycloalkyl of C3 to C21, aromatic of C5-C20, alkaryl of C7 to C30, $R^3N(H)C(=O)R^4$ with $R^3$ bonded to the N of formula (I), and $R^3N(R^5)_2$ with each $R^5$ independently selected from the group consisting of H, alkyl of C1 to C20, alkenyl of C2 to C20, cycloalkyl of C3 to C20, aromatic of C5 to C20 and alkaryl of C7 to C20 and $R^2$ or the terminal $R^5$ therein optionally substituted with one or more OH, $R^3$ is selected from alkyl of C1 to C20, alkenyl of C2 to C20, and cycloalkylene of C3 to C20, $R^4$ is selected from $R^1$, alkyl of C1 to C20, alkenyl of C2 to C20, cycloalkyl of C3 to C20, aromatic of C5 to C20 and alkaryl of C7 to C20. In certain embodiments of the first-third embodiments, the rubber composition comprises 2-5 phr of the at least one fatty acid amide compound of formula (I).

In certain embodiments of the first-third embodiments, the at least one fatty acid amide compound of formula (I) comprises one compound and in other embodiments more than one compound (i.e., two or more). It should be understood that the total amount of fatty acid amide compound is 1-10 phr, and in certain embodiments 2-5 phr. In other words, when more than one fatty acid amide compound is utilized the total amount is 1-10 phr, which includes 2-5 phr.

In certain embodiments of the first-third embodiments, the at least one fatty acid amide compound is at least one diamide, at least one triamide, or a combination thereof, and the total amount of fatty acid amide compound(s) is 1-10 phr, and in certain embodiments 2-5 phr. The terms diamide and triamide indicate that the compound contains two or three amide ($C(=O)NH$) moieties, respectively. In such embodiments, the fatty acid diamide or fatty acid triamide has formula (I) where x=2 or 3. In certain embodiments, the at least one fatty acid amide compound is at least one triamide having formula (I) where x=3. In certain embodiments of the first-third embodiments, the at least one fatty acid amide is a triamide, where x=3.

Formula (I)

In certain embodiments of the first-third embodiments, $R^1$ in formula (I) is phenyl, i.e., $-C_5H_6$ and x=3. In such embodiments, the three $[C(=O)NHR^2]$ groups are preferably in the 1, 3, and 5 positions on the benzene ring and the compounds can be referred to generically as 1,3,5-benzene trisamides. In such embodiments, $R^2$ should be considered to have the definition as provided in the foregoing paragraph. Non-limiting examples of such 1,3,5-benzene trisamides include, but are not limited to, N,N',N''-tris(cyclohexyl)benzene-1,3,5-tricarboxamide (CBCA), and N,N',N''-tris(decyl)benzene-1,3,5-tricarboxamide (DBCA).

As discussed above, in formula (I), $R^1$ is selected from alkyl of C1 to C21, alkenyl of C2 to C21 and cycloalkyl of C3 to C21, aromatic of C5 to C21, alkaryl of C7 to C30. In certain embodiments, $R^1$ is alkyl of C1 to C21, including C8 to C17, and C10 to C17. In certain embodiments of the first-third embodiments, $R^1$ is alkenyl of C2 to C21, including C8 to C17, including C10 to C17. In certain embodiments of the first-third embodiments, $R^1$ is cycloalkyl of C3 to C21, including C5 to C8. In certain embodiments of the first-third embodiments, $R^1$ is aromatic of C5 to C21, including C8 to C17. In certain embodiments of the first-third embodiments, $R^1$ is alkaryl of C7 to C30, including C8 to C17.

As discussed above, in formula (I), $R^2$ is selected from H, alkyl of C1 to C21, alkenyl of C2 to C21 and cycloalkyl of C3 to C21, aromatic of C5-C20, alkaryl of C7 to C30, $R^3N(H)C(=O)R^4$ with $R^3$ bonded to the N of formula (I), and $R^3N(R^5)_2$ with each $R^5$ independently selected from the group consisting of H, alkyl of C1 to C20, alkenyl of C2 to C20, cycloalkyl of C3 to C20, aromatic of C5 to C20 and alkaryl of C7 to C20 and $R^2$ or the terminal $R^5$ therein optionally substituted with one or more OH. In certain embodiments, $R^2$ is alkyl of C1 to C21, including C8 to C17. In certain embodiments of the first-third embodiments, $R^2$ is alkenyl of C2 to C21, including C8 to C17. In certain embodiments of the first-third embodiments, $R^2$ is cycloalkyl of C3 to C21, including C8 to C17. In certain embodiments of the first-third embodiments, $R^2$ is aromatic of C5-C20, including C8 to C17. In certain embodiments of the first-third embodiments, $R^2$ is alkaryl of C7 to C30, including C8 to C17. In certain embodiments of the first-third embodiments of the first-third embodiments, $R^2$ is $R^3N(H)C(=O)R^4$ with $R^3$ bonded to the N of formula (I). In certain embodiments of the first-third embodiments, $R^2$ is $R^3N(R^5)_2$ with each $R^5$ independently selected from the group consisting of H, alkyl of C1 to C20, alkenyl of C2 to C20, cycloalkyl of C3 to C20, aromatic of C5 to C20 and alkaryl of C7 to C20 and $R^2$ or the terminal $R^5$ therein optionally substituted with one or more OH.

As discussed above, in formula (I), $R^3$ is selected from alkyl of C1 to C20, alkenyl of C2 to C20, and cycloalkylene of C3 to C20. In certain embodiments of the first-third embodiments, $R^3$ is alkyl of C1 to C20, including C8 to C17. In certain embodiments of the first-third embodiments, $R^3$ is alkenyl of C2 to C20, including C8 to C17. In certain embodiments of the first-third embodiments, $R^3$ is cycloalkylene of C3 to C20, including C8 to C17.

As discussed above, in formula (I), $R^4$ is selected from $R^1$, alkyl of C1 to C20, alkenyl of C2 to C20, cycloalkyl of C3 to C20, aromatic of C5 to C20 and alkaryl of C7 to C20. In certain embodiments of the first-third embodiments, $R^4$ is $R^1$. In certain embodiments, $R^4$ is alkyl of C1 to C20, including C8 to C17. In certain embodiments, $R^4$ is alkenyl of C2 to C20, including C8 to C17. In certain embodiments, $R^4$ is cycloalkyl of C3 to C20, including C8 to C17. In certain embodiments, $R^4$ is aromatic of C5 to C20, including C8 to C17. In certain embodiments, $R^4$ is alkaryl of C7 to C20, including C8 to C17.

Processing Oil

As discussed above, according to the first-third embodiments, the rubber composition comprises 1 to 20 phr of at least one processing oil. Various types of processing oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PRO-REX 15 and FLEXON 683 from EXXONMOBLE, VIVATEC 200 from BP, PLAXOLENE MS from TOTAL-FINAELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180 and ENERTHENE 1849 from BP, and EXTENSOIL 1996 from REPSOL. Suitable heavy naphthenic oils are available as SHELLFELX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts and seeds. Non-limiting examples include, but are not limited to, soy or soybean oil, sunflower oil, safflower oil, corn oil, linseed oil, cotton seed oil, rapeseed oil, cashew oil, sesame oil, camellia oil, jojoba oil, macadamia nut oil, coconut oil, and palm oil.

In certain embodiments of the first-third embodiment, the total combined amount of the at least one fatty acid amide compound and the at least one processing oil is not more than 20 phr. In certain such embodiments, it should be understood that the amount of at least one fatty acid amide is 1-10 phr and the amount of at least one processing oil is 10-19 phr. In certain such embodiments, the amount of at least one fatty acid is 2-5 phr and the amount of at least one processing oil is 15-18 phr, including 5-15 phr.

Filler

As discussed above, according to the first-third embodiments, the rubber composition comprises 0-100 phr of at least one reinforcing filler. In certain embodiments of the first-third embodiments, the total amount of the reinforcing filler is 5-100 phr. In certain embodiments of the first-third embodiments, the total amount of the reinforcing filler is 20-100 phr. Preferably, the rubber compositions according to the first-third embodiments include 0-100 phr, including 5-100 phr, and 20-100 phr, of at least one reinforcing filler which comprises of at least one of silica or carbon black or a combination of both.

As used herein, the term "reinforcing filler" is intended to include both carbon black filler and inorganic filler. Thus, according to the first-third embodiments disclosed herein, the rubber composition includes (in total) 0-100 phr, including 5-100 phr, including 20-100 phr, of at least one of: one or more carbon blacks, and one or more inorganic fillers. In certain such embodiments, the rubber composition includes both at least one carbon black and at least one inorganic filler. Suitable inorganic fillers for use in the rubber compositions according to the first-fourth embodiments are not particularly limited and non-limiting examples include: silica, aluminum hydroxide, talc, clay, alumina ($Al_2O_3$), aluminum hydrate ($Al_2O_3H_2O$), aluminum hydroxide (Al(OH)$_3$), aluminum carbonate ($Al_2(CO_3)_2$), aluminum nitride, aluminum magnesium oxide ($MgOAl_2O_3$), aluminum silicate ($Al_2SiO_5$, $Al_4.3SiO_4.5H_2O$ etc.), aluminum calcium silicate ($Al_2O_3.CaO_2SiO_2$, etc.), pyrofilite ($Al_2O_3.4SiO_2.H_2O$), bentonite ($Al_2O_3.4SiO_2.2H_2O$), boron nitride, mica, kaolin, glass balloon, glass beads, calcium oxide (CaO), calcium hydroxide (Ca(OH)$_2$), calcium carbonate (CaCO$_3$), calcium silicate (Ca$_2$SiO$_4$ etc.), magnesium carbonate, magnesium hydroxide (MH(OH)$_2$), magnesium oxide (MgO), magnesium carbonate (MgCO$_3$), magnesium silicate (Mg$_2$SiO$_4$, MgSiO$_3$ etc.), magnesium calcium silicate (CaMgSiO$_4$), titanium oxide, titanium dioxide, potassium titanate, barium sulfate, zirconium oxide (ZrO$_2$), zirconium hydroxide [Zr(OH)$_2$.nH$_2$O], zirconium carbonate [Zr(CO$_3$)$_2$], crystalline aluminosilicates, reinforcing grades of zinc oxide (i.e., reinforcing zinc oxide), and combinations thereof.

In certain embodiments of the first-third embodiments, the silica utilized (silicon dioxide) includes wet-process, hydrated silica produced by a chemical reaction in water, and precipitated as ultra-fine spherical particles. One or more than one type of silica can be utilized. In certain of the foregoing embodiments, the silica has a surface area (nitrogen surface area) of about 32 to about 400 m$^2$/g, in another embodiment about 100 to about 250 m$^2$/g, in another embodiment about 200 to about 300 m$^2$/g. and in yet another embodiment, about 150 to about 220 m$^2$/g. The pH of the silica filler in certain of the foregoing embodiments is about 5.5 to about 7 and in another embodiment about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™ 1165MP and 175GRPlus (Rhodia), Vulkasil™ (Bary AG), Ultrasil™ VN2, VN3 (Degussa), and HuberSil™ 8745 (Huber).

In certain embodiments of the first-third embodiments, the carbon black(s) utilized may include any of the commonly available, commercially-produced carbon blacks. These include those having a surface area (EMSA) of at least 20 m$^2$/gram and in other embodiments at least 35 m$^2$/gram up to 200 m$^2$/gram or higher. Surface area values include those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used. Exemplary carbon blacks include those bearing ASTM designation (D-1765-82a) N-110, N-220, N-339, N-330, N-351, N-550, and N-660. In one or more embodiments, the carbon black may include oxidized carbon black. One or more than one carbon black may be utilized.

Cure Package

In certain embodiments of the first-third embodiments, the rubber composition includes a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in the rubber compositions according to certain embodiments of the first-third embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in the rubber compositions according to certain embodiments of the first-third embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

In certain embodiments according to the first-third embodiments, the rubber composition contains no zinc carboxylate curative, i.e., 0 phr of zinc carboxylate curative. As used herein, the term zinc carboxylate curative is meant to include zinc salts of fatty acids (e.g., palmitic acid, stearic acid and oleic acid). Furthermore, the term as used herein is meant to indicate a zinc carboxylate compound that has been mixed prior to adding to the rubber composition. In other words, it is not meant to encompass any zinc carboxylate that might be said to be generated by the addition of separate zinc oxide and a carboxylate-containing compounds to the rubber composition. A non-limiting example of a commercially available zinc carboxylate curative is Polyplastol® 6 (available from Elastomeri-Polimeri Kft., Italy).

Mixing of the Fillers

Where a rubber composition includes fillers other than (or in addition to) carbon black, a separate re-mill stage often is employed for separate addition of the other fillers. This stage often is performed at temperatures similar to, although often slightly lower than, those employed in the masterbatch stage, i.e., ramping from about 90° C. to a drop temperature of about 150° C. For purposes of this application, the term "masterbatch" means the composition that is present during the masterbatch stage or the composition as it exists during any re-mill stage, or both.

Curatives, accelerators, etc., are generally added at a final mixing stage. To avoid undesirable scorching and/or premature onset of vulcanization, this mixing step often is done at lower temperatures, e.g., starting at about 60° to about 65° C. and not going higher than about 105° to about 110° C. For purposes of this application, the term "final batch" means the composition that is present during the final mixing stage.

Reduced Wear or Improved Durability

As previously discussed, according to the first embodiment disclosed herein, the rubber composition meets at least one of (i) or (ii), where (i) is as follows: exhibits reduced wear as exhibited by having a wear index (measured under at least one slip percentage in the range of 10-75%) that is 110% or higher, based upon a comparative rubber compound that contains no fatty acid amide compound of formula (I) but contains additional processing oil in a phr amount equal to the amount of the at least one fatty acid amide in the synthetic conjugated diene monomer containing polymer composition As previously discussed, the second embodiment disclosed herein is directed to a method of achieving reduced wear or improved durability (the two terms are used interchangeably herein) in a tire tread or tire sidewall, the method comprising incorporating the rubber composition comprising components (a)-(e) as follows into a tire tread or tire sidewall. The components are: (a) 80-100 phr of a synthetic conjugated diene monomer-containing polymer selected from the group consisting of polybutadiene with a cis 1,4-bond content of 85% or greater, polyisoprene, and combinations thereof, (b) 0-20 phr of a conjugated diene monomer containing polymer or copolymer selected from the group consisting of polybutadiene with a cis 1,4-bond content of less than 85%, styrene-butadiene copolymer, neoprene, isobutylene, natural rubber, and combinations thereof, (c) 1-10 phr of at least one fatty acid amide compound of formula (I), (d) 1 to 20 phr of at least one processing oil, and (e) 0-100 phr of at least one reinforcing filler. Formula (I) is as follows: wherein formula (I) is $R^1[C(=O)N(H)R^2]_x$, where x=1, 2 or 3, and each [C(=O)N(H)R$^2$] is the same or different, $R^1$ is selected from alkyl of C1 to C21, alkenyl of C2 to C21 and cycloalkyl of C3 to C21, aromatic of C5 to C20, alkaryl of C7 to C30, $R^2$ is selected from H, alkyl of C1 to C21, alkenyl of C2 to C21 and cycloalkyl of C3 to C21, aromatic of C5-C20, alkaryl of C7 to C30, $R^3N(H)C(=O)R^4$ with $R^3$ bonded to the N of formula (I), and $R^3N(R^5)_2$ with each $R^5$ independently selected from the group consisting of H, alkyl of C1 to C20, alkenyl of C2 to C20, cycloalkyl of C3 to C20, aromatic of C5 to C20 and alkaryl of C7 to C20 and $R^2$ or the terminal $R^5$ therein optionally substituted with one or more OH, $R^3$ is selected from alkyl of C1 to C20, alkenyl of C2 to C20, and cycloalkylene of C3 to C20, $R^4$ is selected from $R^1$, alkyl of C1 to C20, alkenyl of C2 to C20, cycloalkyl of C3 to C20, aromatic of C5 to C20 and alkaryl of C7 to C20. Furthermore, upon curing, the rubber composition meets at least one of the following conditions (i) or (ii), as follows: (i) exhibits reduced wear as exhibited by having a wear index (measured under at least one slip percentage in the range of 10-75%) that is 110% or higher, based upon a comparative rubber compound that contains no fatty acid amide compound of formula (I) but contains additional processing oil in a phr amount equal to the amount of the at least one fatty acid amide in the synthetic conjugated diene monomer containing polymer composition, and (ii) exhibits strain induced crystallization.

As used herein, the improvement in the wear or durability in a tire tread or tire sidewall is measured in comparison to the use of a "control" rubber composition that is identical in composition other than containing additional processing oil in a phr amount equal to the amount of the at least one fatty acid amide that is used in the subject rubber composition. As a non-limiting example, if the subject rubber composition contains 4 phr of fatty acid amide and 6 phr of processing oil, the "control" or comparative rubber composition would contain 0 phr of fatty acid amide and 10 phr of processing oil. The improvement in wear or durability can be measured by calculating the wear index of the subject rubber composition. An improvement in wear or durability is considered to exist when the subject rubber composition has a wear index (measured under at least one slip percentage in the range of 10-75%, preferably 25%) that is 110% or higher, based upon a comparative rubber compound that contains no fatty acid amide compound of formula (I) but contains additional processing oil in a phr amount equal to the amount of the at least one fatty acid amide in the subject rubber composition. Correspondingly, such a rubber composition can also be said to exhibit reduced wear or have increased abrasion resistance. In certain embodiments according to the first-third embodiments, the improvement in wear or durability is exhibited by the subject rubber composition having a wear index (measured under at least one slip percentage in the range of 10-75%, preferably 25%) that is at least 115% or higher, based upon a comparative rubber compound that contains no fatty acid amide compound of formula (I) but contains additional processing oil in a phr amount equal to the amount of the at least one fatty acid amide in the subject rubber composition. In certain embodiments according to the first-third embodiments, the improvement in wear or durability is exhibited by the subject rubber composition having a wear index (measured under at least one slip percentage in the range of 10-75%, preferably 25%) that is at least 120% or higher, based upon a comparative rubber compound that contains no fatty acid amide compound of formula (I) but contains additional processing oil in a phr amount equal to the amount of the at least one fatty acid amide in the subject rubber composition. In certain embodiments according to the first-third embodiments, the improvement in wear or durability is exhibited by the subject composition having a wear index (measured at 25% slip) that is at least 110% up to about 140% higher than a comparative rubber compound that contains no fatty acid amide compound of formula (I) but contains additional processing oil in a phr amount equal to the amount of the at least one fatty acid amide in the subject rubber composition. In certain of the foregoing embodiments, the wear index is calculated using measurements taken at 10% slip, 25% slip, 65% slip, or a combination of such measurements.

Strain-Induced Crystallization

Strain-induced crystallization is a phase transformation that an amorphous material undergoes when subjected to stress (strain). While synthetic rubbers such as polyisoprene, polybutadiene and styrene-butadiene copolymer do not usually exhibit the high level of strain-induced crystallization that natural rubber inherently possesses, the use of the at least one fatty acid amide of formula (I), as disclosed herein, allows such synthetic rubbers to exhibit strain-induced crystallization.

As previously discussed, according to the first embodiment disclosed herein, the rubber composition meets at least one of (i) or (ii), where (ii) is as follows: exhibits strain-induced crystallization.

As previously discussed, the third embodiment disclosed herein is directed to a method of achieving strain-induced crystallization in a synthetic rubber-based composition comprising use of a comprising at least one fatty acid amide compound (c), mixed with (a), (b), (d), (e) and (f), and upon curing the composition exhibits strain-induced crystallization. The components are: (a) 80-100 phr of a synthetic conjugated diene monomer-containing polymer selected from the group consisting of polybutadiene with a cis 1,4-bond content of 85% or greater, polyisoprene, and combinations thereof, (b) 0-20 phr of a conjugated diene monomer containing polymer or copolymer selected from the group consisting of polybutadiene with a cis 1,4-bond content of less than 85%, styrene-butadiene copolymer, neoprene, isobutylene, natural rubber, and combinations thereof, (c) 1-10 phr of at least one fatty acid amide compound of formula (I), (d) 1 to 20 phr of at least one processing oil, and (e) 0-100 phr of at least one reinforcing filler. Formula (I) is as follows: wherein formula (I) is $R^1[C(=O)N(H)R^2]_x$, where x=1, 2 or 3, and each [C(=O)N(H)R$^2$] is the same or different, $R^1$ is selected from alkyl of C1 to C21, alkenyl of C2 to C21 and cycloalkyl of C3 to C21, aromatic of C5 to C20, alkaryl of C7 to C30, $R^2$ is selected from H, alkyl of C1 to C21, alkenyl of C2 to C21 and cycloalkyl of C3 to C21, aromatic of C5-C20, alkaryl of C7 to C30, $R^3N(H)C(=O)R^4$ with $R^3$ bonded to the N of formula (I), and $R^3N(R^5)_2$ with each $R^5$ independently selected from the group consisting of H, alkyl of C1 to C20, alkenyl of C2 to C20, cycloalkyl of C3 to C20, aromatic of C5 to C20 and alkaryl of C7 to C20 and $R^2$ or the terminal $R^5$ therein optionally substituted with one or more OH, $R^3$ is selected from alkyl of C1 to C20, alkenyl of C2 to C20, and cycloalkylene of C3 to C20, $R^4$ is selected from $R^1$, alkyl of C1 to C20, alkenyl of C2 to C20, cycloalkyl of C3 to C20, aromatic of C5 to C20 and alkaryl of C7 to C20. Furthermore, upon curing, the rubber composition meets at least one of the following conditions (i) or (ii), as follows: (i) exhibits reduced wear as exhibited by having a wear index (measured under at least one slip percentage in the range of 10-75%) that is 110% or higher, based upon a comparative rubber compound that contains no fatty acid amide compound of formula (I) but contains additional processing oil in a phr amount equal to the amount of the at least one fatty acid amide in the synthetic conjugated diene monomer containing polymer composition, and (ii) exhibits strain-induced crystallization.

The presence of strain-induced crystallization can be measured by any using Differential Scanning Calorimetry (DSC), Wide Angle X-Ray Diffraction (WAXD), or by taking temperature sweep measurements. Established methods for making these measurements are well-known. A non-limiting example includes ASTM D3418-12e1 (Standard Test Method for Transition Temperatures and Enthalpies of Fusion and Crystallization of Polymers by Differential Scanning Calorimetry). Generally, the measurements are made by raising the composition to above its melt temperature. DSC apparatus are generally used to heat a sample of polymer to a designated temperature, at a designated rate and are capable of measuring both the amount of heat required to raise the temperature of the sample and the increase in temperature. WAXD is frequently used to characterize strain-induced crystallization in polymers. WAXD allows identification of the crystalline phase according analysis of the patterns generated. Preferably, the subject composition will show increased strain-induced crystallization above the melt temperature as compared to a composition that contains no fatty acid amide but contains additional processing oil in the same phr amount, according to at least one of the foregoing methods, i.e., DSC, WAXD and temperature sweep. In certain embodiments, the subject rubber composition will show increased strain-induced crystallization according to all three of the foregoing methods.

Tires and Tire Components

In certain embodiments, the rubber compositions according to the first-third embodiments are utilized in a tire component. Non-limiting examples of such tire components, include, but are not limited to a tire sidewall and a tire tread. In certain embodiments, the rubber composition according to the first-third embodiments is utilized in a tire sidewall. In certain embodiments, the rubber composition according to the first-third embodiments is utilized in a tire sidewall. The following embodiments should also be considered to be fully disclosed herein: a tire tread comprising the rubber composition according to any of the foregoing embodiments of the first-third embodiments (i.e., as described throughout the present application), a tire sidewall comprising the rubber composition according to any of the foregoing embodiments of the first-third embodiments (i.e., as described throughout the present application), and a tire incorporating such a tire tread and/or such a tire sidewall.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the polymers or copolymers, fillers, processing oil, and other ingredients (e.g., antioxidant, wax, zinc oxide, stearic acid and curative package ingredients) utilized in the following examples should not be interpreted as limiting since other such ingredients consistent with the disclosure in the Detailed Description can be utilized in substitution. In other words, the particular nucleating agents and their amounts in the following examples should be understood to apply to the more general content of the Detailed Description.

Unless indicated to the contrary herein, all reagents and solvents were used as received from Sigma Aldrich. Proton NMR spectra were recorded on a Varian 300 mHz Mercury Plus spectrometer and the spectra are reported on the δ scale in parts per million and referenced to CHCl3 at δ 7.24 ppm. Infrared data were obtained in cyclohexane solutions using a Perkin-Elmer Spectrum G. Elemental analysis was conducted by Galbraith Laboratories and values are reported as percentages.

Mooney viscosity (ML1+4) values were determined with an Alpha Technologies Mooney viscometer (with a large rotor) The sample was preheated at 130° C. for 1 minute before the rotor was started. The Mooney Viscosity measurement was recorded as the torque after the rotor rotated 4 minutes at 130° C.

Modulus values, including the K Modulus ratio were determined as follows, following the guidelines, but not restricted to, the standard procedure described in ASTM-D412, using micro dumbbell specimens with a dimension of 4 mm in width and 1.91 mm in thickness. A specific gauge length of 44 mm was used for the tensile test. Specimens were strained at a constant rate and the resulting force is recorded as a function of extension (strain). The dumbbell shaped specimen was stretched at a given temperature (after allowing 20 minutes equilibration time) until it broke. A stress versus strain plot was created. The Modulus at 300% strain and at 50% strain was determined from the plot and the Modulus values were used to calculate the K Modulus ratio values. For the ring tear strength testing, the specimen geometry was a round ring having a width of 0.05 inches and of a thickness of 0.075 inches. Rings were notched at two places on the inner circumference of the ring at equidistant locations. The specimen was tested at a specific gauge length of 1.0 inch. Force readings are expressed as engineering stresses by reference to the original cross-sectional area of the test piece. Specimens were tested at 23° C.

The wear resistance of the test samples were evaluated using the Lambourn Abrasion test. Test specimens were rubber wheels of about 48 mm in outside diameter, about 22 mm in inside diameter and about 4.8 mm in thickness. The test specimens were placed on an axle and run at various slip ratios against a driven abrasive surface for approximately 75 seconds. The abrading surface used was 120 grit 3M-ite. A load of about 2.5 kg was applied to the rubber wheel during testing. A linear, least squares curve-fit was applied to the weight loss data as a function of time. The slope of the line is the abrasion rate. The reported wear index is one-hundred multiplied by the control compound abrasion rate divided by the subject compound abrasion rate. Thus, an wear index greater than 100 indicates that the subject composition is better (abrades at a lower rate) than the control compound.

Example 1: N,N'-ethylenebis(stearamide) (EBSA)

EBSA was evaluated for its ability to enhance strain-induced crystallization and wear of carbon black-filled high cis-polybutadiene-containing rubber compositions. The base formulation is shown in Table 1. The EBSA was added at concentrations of 2 and 4 phr, on top of the base formulation as well as partial oil replacement in 300-gram Brabender batches. The EBSA was also added to rubber compositions containing low cis-polybutadiene, instead of the high cis-polybutadiene.

The wear and durability results are shown in the Table 2A for low cis-polybutadiene and Table 2B for high cis-polybutadiene. No wear benefit was identified from adding the EBSA to low cis-polybutadiene. In contrast, a wear improvement was shown in the high cis-polybutadiene samples that contained the EBSA. These results support the hypothesis that EBSA acts as a strain-induced crystallization nucleating agent. The modulus ratio indicator of strain-induced crystallization (Ratio K) and the ring tear strength were clearly increased for the compositions which contained EBSA vs. the control. The results are summarized in the Tables below. In summary, consistent with the apparent improvement in strain-induced crystallization, the ring tear strength at room temperature, the Ratio K, and the abrasion resistance at 25% and 65% slip were improved upon EBSA addition. At 25% slip, the wear index was 10% to 40% better than the control line due to addition of the EBSA.

TABLE 1

| Master Batch | Phr |
|---|---|
| Polymer | 100 |
| Carbon black (N343) | 50 |
| Black Oil (Ergon) | 10 |
| Stearic Acid | 2 |
| Zinc Oxide | 2.5 |
| Wax | 2 |
| Antioxidant | 1 |
| Final Batch | |
| Master Batch | 167.5 |
| Sulfur | 1.3 |
| Accelerators | 1.9 |

TABLE 2A

| | | | | | |
|---|---|---|---|---|---|
| Low cis-polybutadiene (phr)[1] | 100 | 100 | 100 | 100 | 100 |
| Carbon black (phr) | 50 | 50 | 50 | 50 | 100 |
| Black oil (phr) | 10 | 10 | 10 | 8 | 6 |
| EBSA (phr) | 0 | 2 | 4 | 2 | 4 |
| Indexed Mooney viscosity $ML_{1+4}$, 130° C. | 100 | 93 | 87 | 98 | 97 |
| Indexed $\kappa_1$ Modulus ratio (−20° C./23° C.) | 100 | 103 | 99 | 104 | 104 |
| Indexed Ring Tear Strength @ 23° C. (N/mm) | 100 | 100 | 96 | 98 | 101 |
| Wear Index (25% slip) | 100 | 88 | 82 | 81 | 90 |
| Wear Index (65% slip) | 100 | 81 | 89 | 100 | 82 |

[1]Polybutadiene having 33% cis 1,4-bond content, 55% trans 1,4-bond content and 12% vinyl 1,2-bond content.

TABLE 2B

| | | | | | |
|---|---|---|---|---|---|
| High cis-polybutadiene (phr)[2] | 100 | 100 | 100 | 100 | 100 |
| Carbon black (phr) | 50 | 50 | 50 | 50 | 100 |
| Black oil (phr) | 10 | 10 | 10 | 8 | 6 |
| EBSA (phr) | 0 | 2 | 4 | 2 | 4 |
| Indexed Mooney viscosity $ML_{1+4}$, 130° C. | 100 | 93 | 88 | 99 | 99 |
| Indexed $\kappa_1$ Modulus ratio (−20° C./23° C.) | 100 | 112 | 116 | 111 | 110 |
| Indexed Ring Tear Strength @ 23° C. (N/mm) | 100 | 107 | 101 | 104 | 103 |

TABLE 2B-continued

| | | | | | |
|---|---|---|---|---|---|
| Wear Index (25% slip) | 100 | 113 | 118 | 124 | 138 |
| Wear Index (65% slip) | 100 | 109 | 110 | 107 | 119 |

[2]Polybutadiene having 96% cis 1,4-bond content.

Example 2(a): N,N'-ethylenebis(stearamide) (EBSA)

Example 2(b): Octadecanamide (SA)

In this example, EBSA and SA were for its ability to enhance strain-induced crystallization and wear of carbon-black-filled rubber compositions. The base formulation is the same as in Example 1 and shown in Table 1. The EBSA and SA were added at a concentration of 3 phr as partial oil replacement in 300-gram Brabender batches. Three different polymers were tested, low cis-polybutadiene (the same polymer as above in Table 2A), high cis-polybutadiene (the same polymer as above in Table 2B), and synthetic polyisoprene.

Physical testing results are shown below in Table 3A for the low cis-polybutadiene (control), Table 3B for the high cis-polybutadiene and Table 3C for the synthetic polyisoprene. The low cis-polybutadiene was used as a control polymer since it is unable to undergo strain-induced crystallization. No wear benefit of adding SA or EBSA to the low cis-polybutadiene was found. However, there was a wear improvement in the 25% slip and the 65% slip for the high cis-polybutadiene and the polyisoprene (HCl4); this reinforces the hypothesis that these additives (SA and EBSA) function to enhance strain-induced crystallization.

TABLE 3A

| | | | |
|---|---|---|---|
| Low cis-polybutadiene (phr) | 100 | 100 | 100 |
| Carbon black (phr) | 50 | 50 | 50 |
| Black oil (phr) | 10 | 7 | 7 |
| EBSA (phr) | 0 | 3 | 0 |
| SA (phr) | 0 | 0 | 3 |
| Indexed Mooney viscosity $ML_{1+4}$, 130° C. | 100 | 98 | 97 |
| Indexed $\kappa_1$ Modulus ratio (−20° C./23° C.) | 100 | 101 | 101 |
| Indexed Ring Tear Strength @ 23° C. (N/mm) | 100 | 94 | 96 |
| Wear Index (25% slip) | 100 | 99 | 101 |
| Wear Index (65% slip) | 100 | 101 | 102 |

TABLE 3B

| | | | |
|---|---|---|---|
| High cis-polybutadiene (phr) | 100 | 100 | 100 |
| Carbon black (phr) | 50 | 50 | 50 |
| Black oil (phr) | 10 | 7 | 7 |
| EBSA (phr) | 0 | 3 | 0 |
| SA (phr) | 0 | 0 | 3 |
| Indexed Mooney viscosity $ML_{1+4}$, 130° C. | 100 | 98 | 96 |
| Indexed $\kappa_1$ Modulus ratio (−20° C./23° C.) | 100 | 97 | 105 |
| Indexed Ring Tear Strength @ 23° C. (N/mm) | 100 | 97 | 110 |
| Wear Index (25% slip) | 100 | 115 | 119 |
| Wear Index (65% slip) | 100 | 106 | 112 |

TABLE 3C

| Polyisoprene (phr)[1] | 100 | 100 | 100 |
|---|---|---|---|
| Carbon black (phr) | 50 | 50 | 50 |
| Black oil (phr) | 10 | 7 | 7 |
| EBSA (phr) | 0 | 3 | 0 |
| SA (phr) | 0 | 0 | 3 |
| Indexed Mooney viscosity $ML_{1+4}$, 130° C. | 100 | 95 | 99 |
| Indexed $\kappa_1$ Modulus ratio (−20° C./23° C.) | — | — | — |
| Indexed Ring Tear Strength @ 23° C. (N/mm) | 100 | 95 | 94 |
| Wear Index (25% slip) | 100 | 102 | 101 |
| Wear Index (65% slip) | 100 | 101 | 105 |

Examples 3-4: Synthesis of 1,3,5-benezene-trisamides

For the following two syntheses, the amine compound (86 millimoles) was dissolved in dry N-methyl-2-pyrrolidone (200 mL), dry triethylamine (50 mL). 1,3,5-benzene-tricarbonyl trichloride (24 millimoles, in THF) was slowly added and the mixture was stirred for 3 hr at 70° C. After cooling to room temperature, the mixture was precipitated in ice water (600 mL). The mixture was then filtered to retrieve the solid, washed with water and dried. The resulting product was purified by recrystallization from DMF (N,N-dimethylformamide).

Example 3: N,N',N''-tris(cyclohexyl)benzene-1,3,5-tricarboxamide (CBCA)

For synthesis of the CBCA, cyclohexylamine was used as the amine compound. After one recrystallization, 7.4 grams (68% yield) of a white solid were obtained. 1H NMR (DMSO-d6): 1.12 (m, 3H); 1.30 (m, 12H); 1.59 (d, J=11.4 Hz, 3H); 1.77 (m, 12H); 8.29 (s, 3H); 8.48 (d, J=7.8 Hz, 3H). $^{13}$CNMR ($CF_3COOD/CDCl_3$): 25.04 (9C); 32.44 (6C); 51.77 (3C); 130.82 (3C); 134.42 (3C); 168.08 (3C).

Example 4: N,N',N''-tris(decyl)benzene-1,3,5-tricarboxamide (DBCA)

For synthesis of the DBCA, decylamine was used as the amine compound. After one recrystallization 9.0 grams (60% yield) of a white solid were obtained. 1H NMR ($CDCl_3$): 0.89 (m, 9H); 1.28 (bs, 54H); 7.40 (s, 3H); 7.76 (bs, 3H). $^{13}$C NMR (CDCl3): 14.02 (3C); 22.60 (1C); 22.65 (2C); 26.82 (1C); 27.09 (2C); 29.25-29.72 (14C); 31.82 (1C); 31.90 (2C); 33.62 (1C); 40.05 (2C); 42.09 (1C); 127.02 (3C); 135.42 (3C); 167.50 (3C).

CBCA and DBCA were each tested in two polymers, low cis-polybutadiene (control, same polymer as in Table 2A, above) and high cis-polybutadiene (same polymer as in Table 2B, above). The base formulation was the same as in Example 1 and as shown in Table 1. The CBCA or DBCA was added at a concentration of 3 phr as partial oil replacement in 300-gram Brabender batches.

Physical testing results are shown below in Table 4 for both the low cis-polybutadiene (control) and the high cis-polybutadiene. As discussed above, the low cis-polybutadiene was used as a control polymer since it is unable to undergo strain-induced crystallization. No wear benefit of adding CBCA or DBCA to the low cis-polybutadiene was found. Wear improvement was found in high cis-polybutadiene samples where CBCA or DBCA was added, as evidenced by improvements in the 25% slip and the 65% slip. Based upon the data obtained, both CBCA and DBCA function to enhance a strain-induced crystallization in high cis-polybutadiene.

TABLE 4

| | | | | | | |
|---|---|---|---|---|---|---|
| Low cis-polybutadiene (phr) | 100 | 100 | 100 | 0 | 0 | 0 |
| High cis-polybutadiene (phr) | 0 | 0 | 100 | 100 | 100 | 100 |
| Carbon black (phr) | 50 | 50 | 50 | 50 | 50 | 50 |
| Black oil (phr) | 10 | 7 | 10 | 7 | 7 | 7 |
| CBCA (phr) | 0 | 3 | 0 | 0 | 3 | 0 |
| DBCA (phr) | 0 | 0 | 3 | 0 | 0 | 3 |
| Indexed $\kappa_1$ Modulus ratio (−20° C./23° C.) | 100 | 101 | 102 | 100 | 103 | 111 |
| Wear Index (25% slip) | 100 | 92 | 94 | 100 | 134 | 131 |
| Wear Index (65% slip) | 100 | 86 | 89 | 100 | 116 | 103 |

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

This application discloses several numerical range limitations that support any range within the disclosed numerical ranges even though a precise range limitation is not stated verbatim in the specification because the embodiments could be practiced throughout the disclosed numerical ranges. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

All references, including but not limited to patents, patent applications, and non-patent literature are hereby incorporated by reference herein in their entirety.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A rubber composition comprising:
   (a) 80-100 phr of a synthetic conjugated diene monomer-containing polymer selected from the group consisting of polybutadiene with a cis 1,4-bond content of 85% or greater, polyisoprene, and combinations thereof,
   (b) up to 20 phr of a conjugated diene monomer containing polymer or copolymer selected from the group consisting of polybutadiene with a cis 1,4-bond content of less than 85%, styrene-butadiene copolymer, neoprene, isobutylene, natural rubber, and combinations thereof,
   (c) 1-10 phr of at least one fatty acid amide compound of formula (I),
   (d) 1 to 20 phr of at least one processing oil,
   (e) 0-100 phr of at least one reinforcing filler,
   wherein formula (I) is $R^1[C(=O)N(H)R^2]_x$,
   where x=2 or 3, and each $[C(=O)N(H)R^2]$ is the same or different, $R^1$ is selected from alkyl of C1 to C21, alkenyl of C2 to C21, cycloalkyl of C3 to C21, aromatic of C5 to C20, and alkaryl of C7 to C30,
   $R^2$ is selected from H, alkyl of C1 to C21, alkenyl of C2 to C21 and cycloalkyl of C3 to C21, aromatic of C5 to C20, alkaryl of C7 to C30, $R^3N(H)C(=O)R^4$ with $R^3$ bonded to the N of formula (I), and $R^3N(R^5)_2$ with each $R^5$ independently selected from the group consisting of H, alkyl of C1 to C20, alkenyl of C2 to C20, cycloalkyl of C3 to C20, aromatic of C5 to C20 and alkaryl of C7 to C20 and $R^2$ or the terminal $R^5$ therein optionally substituted with one or more OH,
   $R^3$ is selected from alkyl of C1 to C20, alkenyl of C2 to C20, and cycloalkylene of C3 to C20,
   $R^4$ is selected from $R^1$, alkyl of C1 to C20, alkenyl of C2 to C20, cycloalkyl of C3 to C20, aromatic of C5 to C20 and alkaryl of C7 to C20,
   wherein upon curing the rubber composition meets at least one of (i) or (ii), as follows:
   (i) exhibits reduced wear as exhibited by having a wear index (measured under at least one slip percentage in the range of 10-75%) that is 110% or higher, based upon a comparative rubber compound that contains no fatty acid amide compound of formula (I) but contains additional processing oil in a phr amount equal to the amount of the at least one fatty acid amide in the synthetic conjugated diene monomer containing polymer composition, and
   (ii) exhibits strain-induced crystallization, and
   wherein the composition contains no zinc carboxylate curative.

2. The rubber composition according to claim 1, wherein x=3.

3. The rubber composition according to claim 1, wherein $R^1$ is phenyl, x=3.

4. The rubber composition according to claim 1, wherein the at least one fatty acid amide compound of formula (I) is present in an amount of 2 to 5 phr.

5. The rubber composition according to any of claim 1, wherein the composition exhibits a wear index at 25% slip that is at least 15% higher than the wear index of the comparative rubber compound.

6. The rubber composition according to claim 1, wherein the composition exhibits a wear index at 25% slip that is at least 20% higher than the wear index of the comparative rubber compound.

7. The rubber composition according to claim 1, wherein (a) is present in an amount of 90-100 phr.

8. The rubber composition according to claim 1, wherein (a) comprises 100 phr of polybutadiene having a cis 1,4-bond content of 85% or greater.

9. The rubber composition according to claim 1, wherein (a) comprises polybutadiene having a cis 1,4-bond content of 90% or greater.

10. The rubber composition according to claim 1, wherein (c) is selected from the group consisting of: octadecanamide, N,N'-ethylenebis(stearamide), N-(2-(diethylamino)ethyl) stearamide, stearoyl ethanolamide, oleoyl ethyl amide, N-cyclohexanecarbonyltetradecylamine, N-palmitoyl dopamine, arachidoyl ethanolamide, docosanoyl ethanolamide, and combinations thereof.

11. The rubber composition according to claim 1, wherein the combined amount of (c) and (d) is no more than 20 phr.

12. The rubber composition according to claim 1, further comprising:
   (f) a cure package.

13. A method of achieving reduced wear or improved durability in a tire tread or tire sidewall, the method comprising incorporating the rubber composition according to claim 12 into a tire tread or sidewall.

14. A method of achieving strain-induced crystallization in a synthetic rubber-based composition comprising use of the rubber composition according to claim 12, wherein the at least one fatty acid amide compound of (c) is mixed with (a), (b), (d), (e) and (f), and upon curing the composition exhibits strain-induced crystallization.

15. A rubber composition comprising:
   (a) 80-100 phr of a synthetic conjugated diene monomer-containing polymer selected from the group consisting of polybutadiene with a cis 1,4-bond content of 85% or greater, polyisoprene, and combinations thereof,
   (b) up to 20 phr of a conjugated diene monomer containing polymer or copolymer selected from the group consisting of polybutadiene with a cis 1,4-bond content of less than 85%, styrene-butadiene copolymer, neoprene, isobutylene, natural rubber, and combinations thereof,
   (c) 1-10 phr of at least one fatty acid amide compound of formula (I),
   (d) 1 to 20 phr of at least one processing oil,
   (e) 0-100 phr of at least one reinforcing filler,
   wherein formula (I) is $R^1[C(=O)N(H)R^2]_x$,
   where x=2 or 3, and each $[C(=O)N(H)R^2]$ is the same or different,
   $R^1$ is selected from alkyl of C1 to C21, alkenyl of C2 to C21 and cycloalkyl of C3 to C21, aromatic of C5 to C20, alkaryl of C7 to C30,
   $R^2$ is selected from H, alkyl of C1 to C21, alkenyl of C2 to C21 and cycloalkyl of C3 to C21, aromatic of C5 to C20, alkaryl of C7 to C30, $R^3N(H)C(=O)R^4$ with $R^3$ bonded to the N of formula (I), and $R^3N(R^5)_2$ with each $R^5$ independently selected from the group consisting of H, alkyl of C1 to C20, alkenyl of C2 to C20, cycloalkyl of C3 to C20, aromatic of C5 to C20 and alkaryl of C7 to C20 and $R^2$ or the terminal $R^5$ therein optionally substituted with one or more OH,
   $R^3$ is selected from alkyl of C1 to C20, alkenyl of C2 to C20, and cycloalkylene of C3 to C20,
   $R^4$ is selected from $R^1$, alkyl of C1 to C20, alkenyl of C2 to C20, cycloalkyl of C3 to C20, aromatic of C5 to C20 and alkaryl of C7 to C20,
   wherein the combined amount of (c) and (d) is no more than 20 phr,
   wherein upon curing the rubber composition meets at least one of (i) or (ii), as follows:

(ii) exhibits reduced wear as exhibited by having a wear index (measured under at least one slip percentage in the range of 10-75%) that is 110% or higher, based upon a comparative rubber compound that contains no fatty acid amide compound of formula (I) but contains additional processing oil in a phr amount equal to the amount of the at least one fatty acid amide in the synthetic conjugated diene monomer containing polymer composition, and (ii) exhibits strain-induced crystallization, and wherein the composition contains no zinc carboxylate curative.

16. A rubber composition comprising:
(a) 80-100 phr of a synthetic polybutadiene with a cis 1,4-bond content of 90% or greater,
(b) up to 20 phr of a conjugated diene monomer containing polymer or copolymer selected from the group consisting of polybutadiene with a cis 1,4-bond content of less than 85%, styrene-butadiene copolymer, neoprene, isobutylene, natural rubber, and combinations thereof,
(c) 1-10 phr of at least one fatty acid amide compound of formula (I),
(d) 1 to 20 phr of at least one processing oil,
(e) 0-100 phr of at least one reinforcing filler,
wherein formula (I) is $R^1[C(=O)N(H)R^2]_x$,
where x=2 or 3, and each $[C(=O)N(H)R^2]$ is the same or different,
$R^1$ is selected from alkyl of C1 to C21, alkenyl of C2 to C21 and cycloalkyl of C3 to C21, aromatic of C5 to C20, alkaryl of C7 to C30,
$R^2$ is selected from H, alkyl of C1 to C21, alkenyl of C2 to C21 and cycloalkyl of C3 to C21, aromatic of C5 to C20, alkaryl of C7 to C30, $R^3N(H)C(=O)R^4$ with $R^3$ bonded to the N of formula (I), and $R^3N(R^5)_2$ with each $R^5$ independently selected from the group consisting of H, alkyl of C1 to C20, alkenyl of C2 to C20, cycloalkyl of C3 to C20, aromatic of C5 to C20 and alkaryl of C7 to C20 and $R^2$ or the terminal $R^5$ therein optionally substituted with one or more OH,
$R^3$ is selected from alkyl of C1 to C20, alkenyl of C2 to C20, and cycloalkylene of C3 to C20,
$R^4$ is selected from $R^1$, alkyl of C1 to C20, alkenyl of C2 to C20, cycloalkyl of C3 to C20, aromatic of C5 to C20 and alkaryl of C7 to C20,
wherein the combined amount of (c) and (d) is no more than 20 phr,
wherein upon curing the rubber composition meets at least one of (i) or (ii), as follows:
(iii) exhibits reduced wear as exhibited by having a wear index (measured under at least one slip percentage in the range of 10-75%) that is 110% or higher, based upon a comparative rubber compound that contains no fatty acid amide compound of formula (I) but contains additional processing oil in a phr amount equal to the amount of the at least one fatty acid amide in the synthetic conjugated diene monomer containing polymer composition, and
(ii) exhibits strain-induced crystallization, and
wherein the composition contains no zinc carboxylate curative.

17. A tire tread comprising the rubber composition of claim 1.

18. A tire sidewall comprising the rubber composition of claim 1.

19. A tire incorporating at least one of the tire tread of claim 17.

* * * * *